US011510061B1

(12) United States Patent
Lin et al.

(10) Patent No.: US 11,510,061 B1
(45) Date of Patent: Nov. 22, 2022

(54) MITIGATION OF CYBERATTACKS ON CELLULAR DEVICES

(71) Applicant: Trend Micro Incorporated, Tokyo (JP)

(72) Inventors: Chih-Shen Lin, Taipei (TW); Jyun-Yan Cheng, Taipei (TW); Ting-Yin Yen, Taipei (TW); Yi-Lun Li, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 156 days.

(21) Appl. No.: 17/137,789

(22) Filed: Dec. 30, 2020

(51) Int. Cl.
| | | |
|---|---|---|
| *H04L 29/06* | (2006.01) | |
| *H04L 12/26* | (2006.01) | |
| *H04W 12/122* | (2021.01) | |
| *H04W 76/30* | (2018.01) | |
| *H04W 48/02* | (2009.01) | |
| *H04W 76/10* | (2018.01) | |
| *H04W 12/40* | (2021.01) | |
| *H04L 9/40* | (2022.01) | |
| *G16Y 30/10* | (2020.01) | |
| *H04W 4/14* | (2009.01) | |
| *G16Y 10/75* | (2020.01) | |

(52) U.S. Cl.
CPC ....... *H04W 12/122* (2021.01); *H04L 63/1458* (2013.01); *H04W 12/40* (2021.01); *H04W 48/02* (2013.01); *H04W 76/10* (2018.02); *H04W 76/30* (2018.02); *G16Y 10/75* (2020.01); *G16Y 30/10* (2020.01); *H04L 2463/141* (2013.01); *H04W 4/14* (2013.01)

(58) Field of Classification Search
CPC ... H04W 12/122; H04W 76/30; H04W 76/10; H04W 12/40; H04W 4/14; H04W 48/02; G16Y 30/10; G16Y 10/75; H04L 63/1458; H04L 2463/141
USPC ........................................................ 726/23
See application file for complete search history.

(56) References Cited

U.S. PATENT DOCUMENTS

| | | | |
|---|---|---|---|
| 9,628,994 B1 | 4/2017 | Gunyel et al. | |
| 10,237,301 B2 | 3/2019 | Polepalli et al. | |
| 10,893,466 B2 | 1/2021 | Ryan et al. | |
| 2013/0316765 A1* | 11/2013 | Helmreich | H04W 4/50 455/558 |
| 2016/0007190 A1* | 1/2016 | Wane | G06F 9/45533 455/419 |
| 2019/0053054 A1* | 2/2019 | Seshadri | H04L 63/101 |
| 2021/0051577 A1* | 2/2021 | Won | H04W 76/18 |
| 2021/0400485 A1* | 12/2021 | Ergen | G06F 16/9537 |

FOREIGN PATENT DOCUMENTS

| | | | | |
|---|---|---|---|---|
| CN | 107182050 B | * | 9/2021 | ......... H04L 63/0876 |
| CN | 114365582 A | * | 4/2022 | ......... H04W 60/005 |
| DE | 102012006222 A1 | * | 10/2013 | ............ H04W 4/50 |
| KR | 20220006186 A | * | 1/2022 | ......... H04W 60/005 |

* cited by examiner

*Primary Examiner* — Haresh N Patel
(74) *Attorney, Agent, or Firm* — Beyer Law Group LLP

(57) ABSTRACT

A pause command is sent to a Subscriber Identity Module (SIM) card of a cellular device in response to detecting a cyberattack against the cellular device on the cellular network. To mitigate the cyberattack, the SIM card temporarily disconnects the cellular device from the cellular network for a pause time. The SIM card prohibits the cellular device from connecting to the cellular network during the pause time and automatically allows the cellular device to reconnect to the cellular network after the pause time.

20 Claims, 3 Drawing Sheets

MITIGATION OF CYBERATTACKS ON CELLULAR DEVICES

BACKGROUND OF THE INVENTION

1. Field of the Invention

The present invention relates generally to cybersecurity, and more particularly but not exclusively to systems and methods for mitigating cyberattacks on cellular devices.

2. Description of the Background Art

A cellular device, such as a mobile phone, has an associated Subscriber Identification Module (SIM) that enables the cellular device to connect to a cellular network. The SIM is also referred to as a "SIM card." Generally speaking, a SIM card comprises an integrated circuit that stores information for identifying and authenticating subscribers of a cellular network. With the advent of faster cellular networks, such as 5G networks, devices other than mobile phones are able to take advantage of data communications over cellular networks.

For example, by incorporating a SIM card, Internet of things (IOT) devices are able to wirelessly exchange data with other devices on the public Internet over cellular networks. However, an IOT device typically does not have sufficient computing resources to run cybersecurity software. More particularly, an IOT device typically only has enough computing resources to perform its limited function. This makes IOT devices vulnerable to cyberattacks, such as Denial of Service (DoS) attacks.

SUMMARY

In one embodiment, a pause command is sent to a Subscriber Identity Module (SIM) card of a cellular device in response to detecting a cyberattack against the cellular device. To mitigate the cyberattack, the SIM card temporarily disconnects the cellular device from the cellular network for a pause time. The SIM card prohibits the cellular device from connecting to the cellular network during the pause time and automatically allows the cellular device to reconnect to the cellular network after the pause time.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
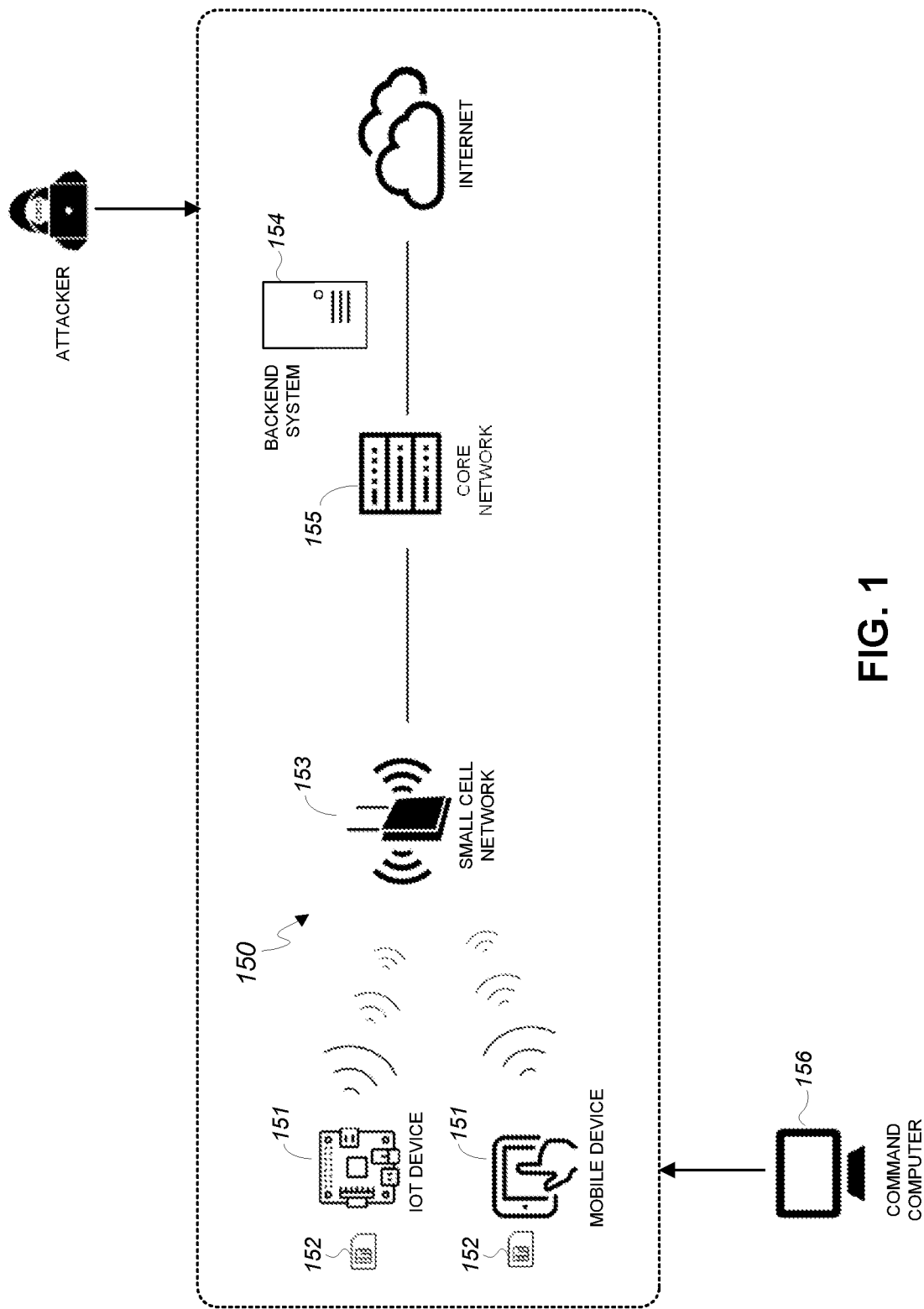
FIG. 1 shows a logical diagram of system for mitigating a cyberattack on a cellular device in accordance with an embodiment of the present invention.

FIG. 1 shows a logical diagram of a system for mitigating cyberattacks on cellular devices in accordance with an embodiment of the present invention. In the example of FIG. 1, the system includes a plurality of cellular devices 151 that have associated Subscriber Identity Module (SIM) cards 152, a backend system 154, and a command computer 156. The system is configured to operate in conjunction with a cellular network 150, which in one embodiment is a 5G cellular network. As can be appreciated, embodiments of the present invention are equally applicable to other cellular networks. In the example of FIG. 1, the cellular network 150 includes a core network 155 and a small cell network 153. The core network 155 and the small cell network 153 may comprise core and small cell networks that are deployed by cellular service providers.

A cellular device 151 may be a mobile phone, IOT device, or another device that connects to a cellular network using a SIM card. In the example of FIG. 1, each cellular device 151 has an associated SIM card 152 that allows the cellular device 151 to be identified and authenticated as a subscriber on the cellular network 150. Once identified and authenticated, the cellular device 151 connects to the cellular network 150 by way of the small cell network 153. This allows the cellular device 151 to communicate with other devices over the public Internet.

Generally speaking, Internet of things (IOT) devices are everyday objects with an embedded computer that allows for data communication over a computer network.

Examples of IOT devices include smart cameras, smart household appliances, smart factory equipment, fitness trackers, etc. IOT devices typically need to communicate over the public Internet to access a cloud service or to report to an external server. A SIM card and associated electrical circuits for connecting to a cellular network allow for flexibility in physically deploying IOT devices.

Because of its limited computing resources, an IOT device is vulnerable to cyberattacks once connected to the public Internet. In the example of FIG. 1, a backend system 154 may comprise a server computer, a security appliance, or other computing device for providing cybersecurity. The backend system 154 may be deployed as an Application Function of a 5G cellular network 150, in the cloud, or other deployment that allows the backend system 154 to connect to the data plane of the cellular network 150. In one embodiment, the backend system 154 is configured to monitor, at the network layer, data transmitted over the cellular network 150 to detect cyberattacks against the cellular devices 151. The backend system 154 may employ any suitable conventional algorithm for detecting cyberattacks.

A cellular device may need to be disconnected from the cellular network as a form of mitigation against certain cyberattacks. For example, a cellular device that is a target of a Denial of Service (DoS) attack may need to be disconnected from the cellular network to alleviate damage to the network due to heavy network traffic. In the example of FIG. 1, a cellular device 151 has a SIM card 152 that can be commanded by a remote computing device, such as by the backend system 154 or a command computer 156, to cause the cellular device 151 to temporarily disconnect from the cellular network 150.

In an example operation, a cellular device 151 is an IOT device that is connected to the cellular network 150 by way of the small cell network 153. Connecting to the cellular network 150 allows the IOT device to send and receive data over a computer network including the public Internet. Internet connectivity enriches the functionality of the IOT device, but also allows an attacker to target the IOT device. In one embodiment, the backend system 154 monitors, at the network layer, data packets of network traffic involving the IOT device (and other cellular devices 151). When the backend system 154 detects that the IOT device is under attack, the backend system 154 is configured to initiate sending a pause command to the SIM card 152 of the IOT device. The pause command may be sent to the SIM card 152 by Short Message Service (SMS), Bearer Independent Protocol (BIP), or other way of sending messages to the SIM card 152. The IOT device receives the pause command, identifies the pause command as being for the SIM card 152, and forwards the pause command to the SIM card 152.

For example, the command computer 156 may be a BIP server that is configured to send a pause command to a SIM card 152 by BIP. As another example, the command computer 156 may be a computer that is configured to send a pause command to a SIM card 152 by SMS. The command computer 156 may receive instructions from the backend system 154 to send the pause command. As can be appreciated, the backend system 154 itself may be configured to send the pause command by BIP, SMS, etc. The pause command is received by the IOT device, which forwards the pause command to a security application in the SIM card 152. In response to receiving the pause command, the security application prohibits the IOT device from connecting to the cellular network 150, thereby causing the IOT device to disconnect from the cellular network 150. After a pause time has elapsed, the security application allows the IOT device to connect to the cellular network 150, thereby causing the IOT device to reconnect to the cellular network 150. As can be appreciated from the foregoing, sending the pause command to the SIM card 152 causes the IOT device to be temporarily disconnected from the cellular network 150.

Figure 2:
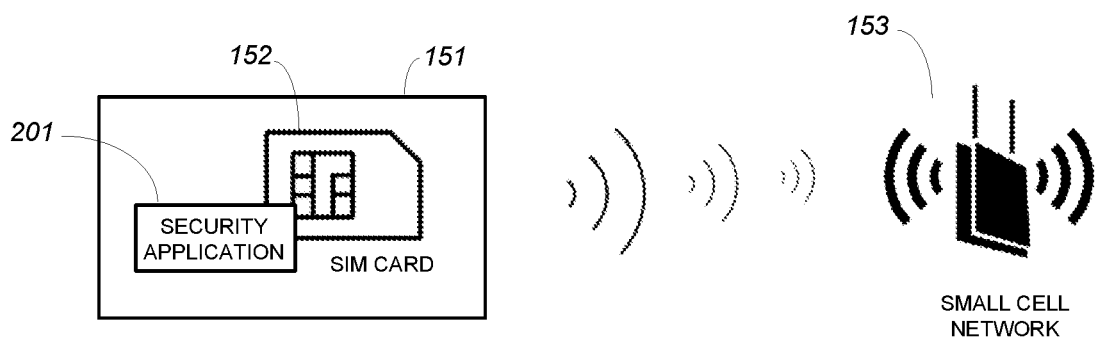
FIG. 2 shows a logical diagram of a cellular device in accordance with an embodiment of the present invention.

FIG. 2 shows a logical diagram of a cellular device 151 in accordance with an embodiment of the present invention. The cellular device 151 may be a commercially-available IOT device, mobile phone, or another cellular device. The cellular device 151 has an associated SIM card 152. Stored in the SIM card 152 is a security application 201, which may be implemented using a SIM Application Toolkit. The security application 201 comprises instructions that are executed by the processor of the SIM card 152 to cause the cellular device 151 to temporarily disconnect from the cellular network 150 in response to receiving a pause command as described herein.

Figure 3:
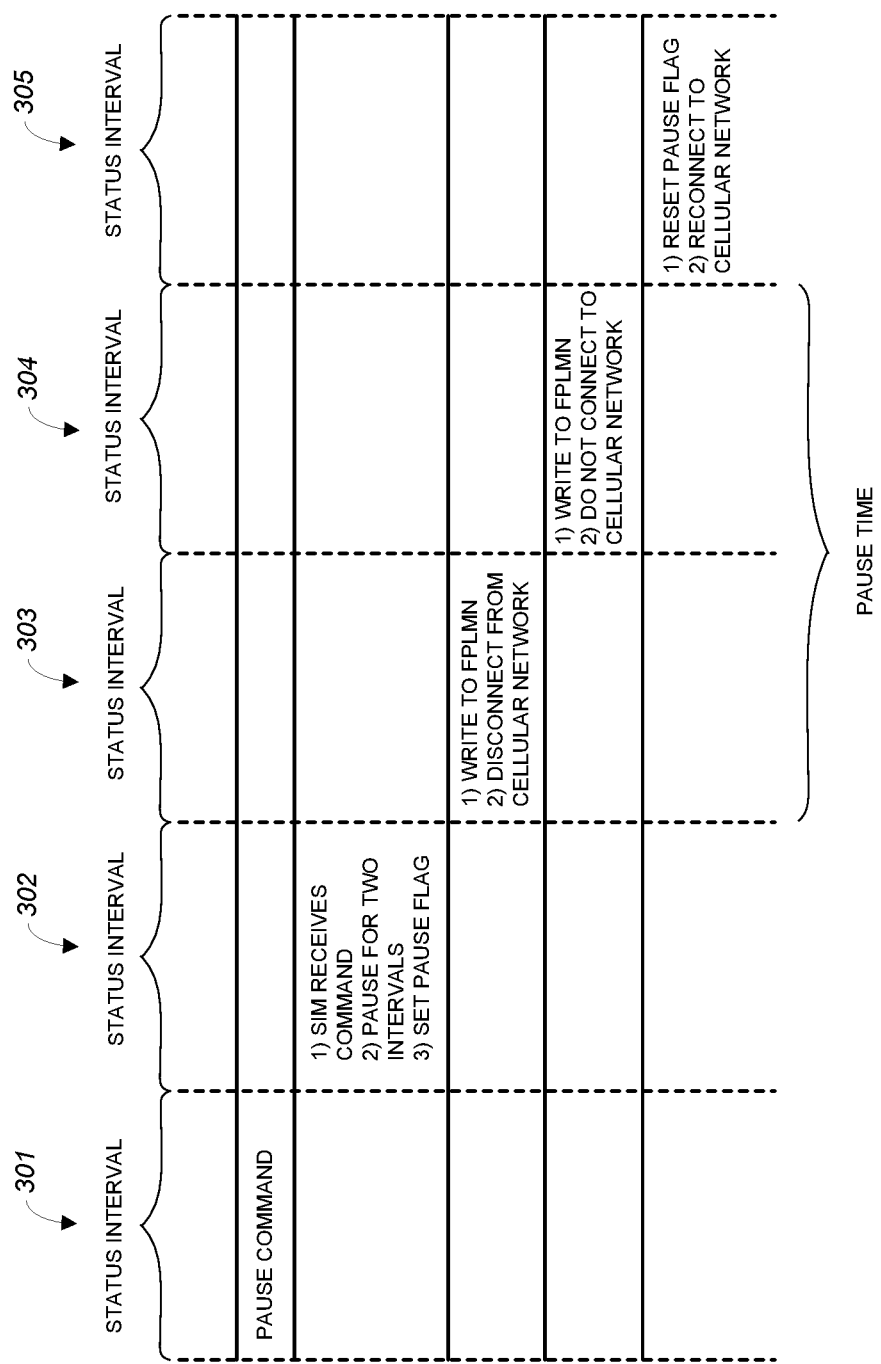
FIG. 3 shows a timing diagram of an example operation of a SIM card as programmed with a security application in accordance with an embodiment of the present invention.

FIG. 3 shows a timing diagram of an example operation of a SIM card 152 as programmed with the security application 201 in accordance with an embodiment of the present invention. In the example of FIG. 3, each "status interval" is a time interval of the cellular device 151 polling the SIM card 152 for status. As previously noted, a pause command may be sent to the SIM card 152 to temporarily disconnect the cellular device 151 from the cellular network 150. During a first status interval (see 301), the pause command is received by the cellular device 151, which forwards the pause command to the SIM card 152. During a following second status interval (see 302), the SIM card 152 receives the pause command and, in response, sets (i.e., make logical TRUE) a pause status flag to prohibit the cellular device 151 from connecting to the cellular network 150 for a pause time, which in this example is two status intervals. As can be appreciated, the pause time may be varied depending on implementation particulars.

During a following third status interval (see 303), the SIM card 152 includes the cellular network 150 (as identified by its Public Land Mobile Network information) in the Forbidden Public Land Mobile Network (FPLMN) list in the SIM card 152. The FPLMN list is a listing of forbidden cellular networks; the cellular device 151 will not connect to any cellular network included in the FPLMN list. Because the cellular network 150 is the current cellular network, including the cellular network 150 in the FPLMN list causes the cellular device 151 to disconnect from the cellular network 150.

During a following fourth status interval (see 304), the SIM card 152 again includes the cellular network 150 in the FPLMN list in the SIM card 152. Because the cellular device 151 is not connected to any cellular network at this point, the cellular device 151 will scan for other cellular networks. When the cellular device 151 fails to connect to a cellular network, that cellular network is included in the FPLMN list in the SIM card 152, which may end up removing the cellular network 150 from the FPLMN list. Accordingly, the SIM card 152 includes the cellular network 150 in the FPLMN list during each status interval in which the cellular device 151 is prohibited from connecting to the cellular network 150. In one embodiment, the SIM card 152 does so while the pause status flag is set. In this example, because the pause time is predetermined to be two status intervals, the cellular network 150 is included in the FPLMN list in two status intervals (see 303 and 304).

The pause time expires in the following fifth status interval (see 305). During the fifth status interval, the SIM card 152 resets the pause status flag (i.e., make logical FALSE) and does not include the cellular network 150 in the FPLMN list. The SIM card 152 may be configured to write arbitrary digits in the FPLM list to ensure that the cellular network 150 is no longer in the FPLMN list. Because the cellular network 150 is no longer in the FPLMN list, the cellular device 151 is able to reconnect to the cellular network 150. In practice, there may be a delay in reconnecting to the cellular network 150. Such delay may be taken into account in determining the suitable pause time for a particular implementation.

Unlike other solutions that require direct integration with the core network or involve firmware changes to the cellular device, embodiments of the present invention can be implemented by simply providing SIM cards as disclosed herein. For example, with the present embodiments, cybersecurity vendors that are not associated with cellular network providers or cellular device manufacturers gain the ability to temporarily disconnect cellular devices for cybersecurity reasons by simply providing SIM cards as disclosed herein. Furthermore, SIM cards are widely available and can be manufactured at relatively low cost, making embodiments of the present invention very cost-effective to implement.

Figure 4:
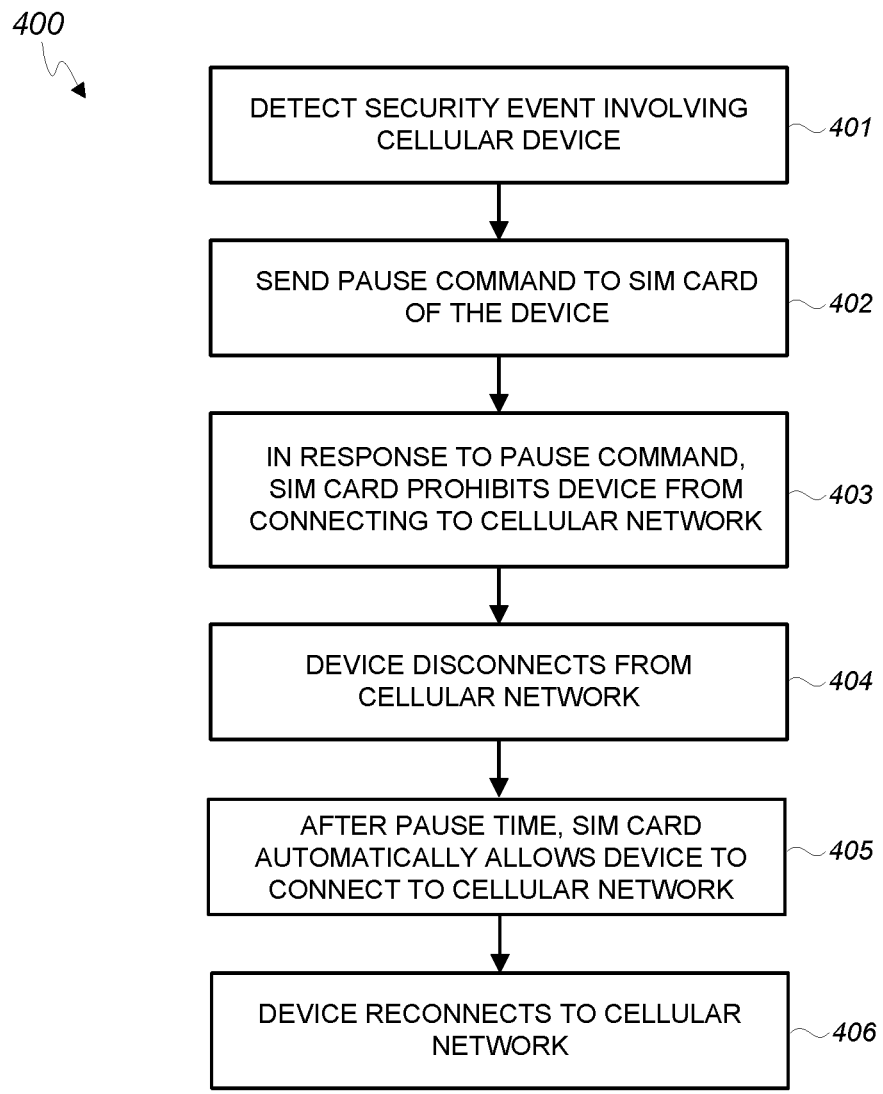
FIG. 4 shows a flow diagram of a method of mitigating cyberattacks on cellular devices in accordance with an embodiment of the present invention.

FIG. 4 shows a flow diagram of a method 400 of mitigating cyberattacks on cellular devices in accordance with an embodiment of the present invention. The method 400 is explained using previously-described components. As can be appreciated, other components may also be employed without detracting from the merits of the present invention.

In the method 400, a security event involving a cellular device that is connected to a cellular network is detected by a backend system (step 401). The security event may be a cyberattack originated from the Internet that targets the cellular device, such as a DoS attack against an IOT device. To mitigate the cyberattack, a pause command is sent to a SIM card of the cellular device (step 402). The pause command may be sent to the SIM card by SMS or BIP, for example. The pause command is received by the cellular device, which forwards the pause command to the SIM card. In response to the pause command, the SIM card prohibits the cellular device from connecting to the cellular network (step 403). For example, the SIM card may include the cellular network in a forbidden cellular network list to prevent the cellular device from connecting to the cellular network. The SIM card may continue including the cellular network in the forbidden cellular network list, e.g., during each status interval, until end of a pause time. The cellular device disconnects from the network and does not connect to the cellular network while the cellular network is included in the forbidden cellular network list (step 404). After the pause time, the SIM card automatically allows the cellular device to reconnect to the cellular network (step 405). In one embodiment, the SIM card stops including the cellular network in the forbidden cellular network list, resulting in the cellular device reconnecting to the cellular network (step 406).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of mitigating a cyberattack against a cellular device that is connected to a cellular network, the method comprising:
    detecting the cyberattack against the cellular device;
    in response to detecting the cyberattack, sending a pause command to a Subscriber Identity Module (SIM) card of the cellular device;
    the SIM card prohibiting the cellular device from connecting to the cellular network for a duration of a pause time;
    the cellular device disconnecting from the cellular network in response to the SIM card prohibiting the cellular device from connecting to the cellular network;
    the SIM card automatically allowing the cellular device to connect to the cellular network after expiration of the pause time; and
    the cellular device reconnecting to the cellular network in response to the SIM card automatically allowing the cellular device to connect to the cellular network.

2. The method of claim 1, wherein the SIM card includes the cellular network in a forbidden cellular network list to prohibit the cellular device from connecting to the cellular network for the duration of the pause time.

3. The method of claim 2, further comprising:
    the SIM card including the cellular network in the forbidden cellular network list for a number of status intervals that corresponds to the pause time.

4. The method of claim 1, wherein the pause command is sent to the SIM card of the cellular device by Short Message Service (SMS).

5. The method of claim 1, wherein the pause command is sent to the SIM card of the cellular device by Bearer Independent Protocol (BIP).

6. The method of claim 1, wherein the cyberattack is a Denial of Service (DoS) attack and the cellular device is an Internet of things (IOT) device.

7. A system for mitigating cyberattacks on cellular devices, the system comprising:
    a backend system that is configured to monitor data transmitted over a cellular network, to detect a cyberattack against a cellular device that is connected to the cellular network, and to initiate sending a pause command to the cellular device in response to detecting the cyberattack; and
    the cellular device, the cellular device including a Subscriber Identity Module (SIM) card that is configured to receive the pause command and to temporarily disconnect the cellular device from the cellular network for a pause time to mitigate the cyberattack.

8. The system of claim 7, wherein the SIM card is configured to prohibit the cellular device from connecting to the cellular network during the pause time and to automatically allow the cellular device to connect to the cellular network after the pause time.

9. The system of claim 8, wherein the SIM card is configured to include the cellular network in a forbidden cellular network list to prohibit the cellular device from connecting to the cellular network.

10. The system of claim of claim 9, wherein the SIM card is configured to, after the pause time, not include the cellular network in the forbidden cellular network list to automatically allow the cellular device to connect to the cellular network.

11. The system of claim 7, wherein the cellular device is an Internet of Things (IOT) device.

12. The system of claim 11, wherein the cyberattack is a Denial of Service (DoS) attack against the IOT device.

13. The system of claim 7, further comprising:
    a command computer that is configured to send the pause command to the SIM card by Bearer Independent Protocol (BIP).

14. The system of claim 7, further comprising:
    a command computer that is configured to send the pause command to the SIM card by Short Message Service (SMS).

15. A method of mitigating a cyberattack against an Internet of Things (IOT) device, the method comprising:
    detecting the cyberattack against the IOT device;
    in response to detecting the cyberattack, sending a pause command to a Subscriber Identity Module (SIM) card of the IOT device;
    in response to the pause command, the SIM card temporarily disconnecting the IOT device from the cellular network for a pause time; and
    the cellular device reconnecting to the cellular network after the pause time.

16. The method of claim 15, wherein the cyberattack is a Denial of Service (DoS) attack that targets the IOT device.

17. The method of claim 15, wherein the pause command is sent to the SIM card by Short Message Service (SMS).

18. The method of claim 15, wherein the pause command is sent to the SIM card by Bearer Independent Protocol (BIP).

19. The method of claim 15, wherein the SIM card includes the cellular network in a forbidden cellular network list to temporarily disconnect the IOT device from the cellular network for a duration of the pause time.

20. The method of claim 19, wherein the SIM card does not include the cellular network in the forbidden cellular network list to allow the IOT device to reconnect to the cellular network after the pause time.

* * * * *